(12) United States Patent
Lin

(10) Patent No.: US 7,334,463 B2
(45) Date of Patent: Feb. 26, 2008

(54) TIRE PARAMETER SENSING SYSTEM HAVING A TIRE ROTATION DEPENDENT TRANSMISSION SCHEME

(75) Inventor: Xing Ping Lin, Orchard Lake, MI (US)

(73) Assignees: TRW Automotive U.S. LLC, Farmington Hills, MI (US); Societe de Technologie Michelin, Clermont-Ferrand (FR)

( * ) Notice: Subject to any disclaimer, the term of this patent is extended or adjusted under 35 U.S.C. 154(b) by 0 days.

(21) Appl. No.: 11/056,495

(22) Filed: Feb. 11, 2005

(65) Prior Publication Data
US 2006/0179930 A1    Aug. 17, 2006

(51) Int. Cl.
B60C 23/02  (2006.01)
G60C 23/02  (2006.01)

(52) U.S. Cl. .................................... 73/146.4
(58) Field of Classification Search ........ 73/146–146.8
See application file for complete search history.

(56) References Cited

U.S. PATENT DOCUMENTS

| | | | |
|---|---|---|---|
| 6,408,690 B1 | 6/2002 | Young et al. | |
| 6,604,416 B2 * | 8/2003 | Tsujita | 73/146.5 |
| 6,931,923 B2 * | 8/2005 | Katou et al. | 73/146.5 |
| 6,967,571 B2 * | 11/2005 | Tsujita | 340/447 |
| 2004/0155762 A1 | 8/2004 | Lefaure | |
| 2004/0193340 A1 | 9/2004 | Katou | |
| 2004/0206168 A1 * | 10/2004 | Katou et al. | 73/146 |
| 2005/0172707 A1 * | 8/2005 | Kanatani et al. | 73/146 |

* cited by examiner

*Primary Examiner*—Max Noori
(74) *Attorney, Agent, or Firm*—Tarolli, Sundheim, Covell & Tummino LLP

(57) ABSTRACT

A tire parameter sensing system (12) for a vehicle (10) comprises a vehicle-based unit (42) for receiving parameter signals. A tire-based unit (34) is associated with a tire (16) of the vehicle (10) and rotates with the tire (16). The tire-based unit (34) is located in a communication zone (134) for communicating with the vehicle-based unit (42) through only a portion of each rotation of the tire (16). The tire-based unit (34) is configured to sense a parameter of the tire (16) and to transmit a parameter signal (54) indicative thereof. The system (12) also comprises means (78) for monitoring the rotation of the tire and for providing rotation information indicative of the monitored tire rotation. The tire-based unit (34) is responsive to the rotation information for transmitting the parameter signal (54) while the tire-based unit (34) is located the communication zone (134).

24 Claims, 3 Drawing Sheets

TIRE PARAMETER SENSING SYSTEM HAVING A TIRE ROTATION DEPENDENT TRANSMISSION SCHEME

TECHNICAL FIELD

The present invention relates to a tire parameter sensing system for a vehicle and to an associated method. More particularly, the present invention relates to a tire parameter sensing system and to an associated method in which a tire-based unit provides parameter signals to a vehicle-based unit according to a transmission scheme that is dependent upon tire rotation.

BACKGROUND OF THE INVENTION

Tire parameter sensing systems for vehicles typically include a plurality of tire-based units and a single vehicle-based unit. Each tire-based unit has an associated tire of the vehicle and is operable to sense at least one parameter of the tire. The sensed parameter(s) may include temperature, pressure, etc. Each tire-based unit is also operable to transmit a parameter signal indicative of the sensed parameter(s) to the vehicle-based unit. The vehicle-based unit is connected to a display. In response to receiving a parameter signal from a tire-based unit, the vehicle-based unit outputs a signal to the display. The display is responsive to the signal for displaying the sensed tire parameter(s).

It is common for a tire-based unit of a tire parameter sensing system to be fixed for rotation with its associated tire. Typically, the tire-based unit is fixed to a rim upon which the tire is mounted. The rim and mounted tire collectively form a wheel assembly of the vehicle. The wheel assembly rotates relative to a body of the vehicle during movement of the vehicle. During the rotation of the wheel assembly, the tire-based unit moves relative to the vehicle-based unit. During a portion of each rotation of the wheel assembly, the rim of the wheel assembly becomes interposed between the tire-based unit and the vehicle-based unit. When the rim is located between the tire-based unit and the vehicle-based unit, the rim may block the parameter signals that are transmitted from the tire-based unit to the vehicle-based unit. Additionally, when the tire-based unit is located at certain rotational positions relative to the vehicle, attenuation of the parameter signals may occur as the parameter signals pass through the structure of the tire. As a result, a signal to noise ratio of a parameter signal that is received by the vehicle-based unit may be too low for enabling the vehicle-based unit to accurately extract the sensed parameter(s).

A communication zone is associated with each tire-based unit of the tire parameter sensing system. Parameter signals transmitted from a tire-based unit located within the communication zone are generally received at the vehicle-based unit with a signal to noise ratio sufficient for the vehicle-based unit to accurately extract the sensed parameter(s). Typically, the communication zone is located between the rim of an associated wheel assembly and the vehicle-based unit. The tire-based unit passes into and out of the communication zone during rotation of the wheel assembly. When the tire-based unit is located outside of the communication zone, parameter signals transmitted from the tire-based unit are less likely to be received at the vehicle-based unit and, when received, are likely to have low signal to noise ratios. A tire parameter sensing system for transmitting parameter signals while the tire-based unit is in the communication zone is desired.

SUMMARY OF THE INVENTION

The present invention relates to a tire parameter sensing system for a vehicle. The system comprises a vehicle-based unit for receiving parameter signals and for providing tire parameter information to an operator of the vehicle. A tire-based unit is associated with a tire of the vehicle and rotates with the tire. The tire-based unit is located in a communication zone for communicating with the vehicle-based unit through only a portion of each rotation of the tire. The tire-based unit is configured to sense at least one parameter of the tire and to transmit a parameter signal indicative of the sensed parameter. The system also comprises means for monitoring the rotation of the tire and for providing rotation information indicative of the monitored tire rotation. The tire-based unit is responsive to the rotation information for transmitting the parameter signal while the tire-based unit is located in the communication zone.

In accordance with another aspect, the present invention relates to a tire parameter sensing system for a vehicle. The system comprises a vehicle-based unit for receiving parameter signals and for indicating tire parameter information to an operator of the vehicle. A tire-based unit is associated with a tire of the vehicle and rotates with the tire. The tire-based unit is located in a communication zone for communicating with the vehicle-based unit through only a portion of each rotation of the tire. The tire-based unit is configured to sense at least one parameter of the tire and to transmit a parameter signal indicative of the sensed parameter. The system also comprises means for monitoring the rotation of the tire and for providing rotation information indicative thereof. The tire-based unit is responsive to the rotation information for transmitting the parameter signal at least a minimum number of times with the transmissions of the parameter signal being spaced from one another by an approximately equal angle of rotation of the tire so that at least one of the transmissions occurs from within the communication zone.

According to yet another aspect, the present invention relates to a method of operating a tire parameter sensing system of a vehicle in which a tire-based unit is associated with a tire of the vehicle and rotates with the tire. The tire-based unit is located in a communication zone with a vehicle-based unit through only a portion of each rotation of the tire. The method comprises the steps of: operating the tire-based unit to sense at least one parameter of the tire; monitoring rotation of the tire and providing rotation information indicative of the monitored tire rotation; transmitting, in response to the rotation information, a parameter signal indicative to the sensed parameter from the tire-based unit to the vehicle-based unit while the tire-based unit is located in the communication zone; receiving the parameter signal at the vehicle-based unit; and providing an indication of the sensed parameter of the tire.

In accordance with a further aspect, the present invention relates to a method of operating a tire parameter sensing system for a vehicle in which a tire-based unit is associated with a tire of the vehicle and rotates with the tire. The tire-based unit is located in a communication zone with a vehicle-based unit through only a portion of each rotation of the tire. The method comprising the steps of: operating the tire-based unit to sense at least one parameter of the tire; monitoring rotation of the tire and providing rotation information indicative of the monitored tire rotation; transmitting, in response to the rotation information, a parameter signal, indicative of the sensed parameter of the tire, a number of times with transmissions of the parameter signal being spaced from one another by an approximately equal angle of rotation of the tire so at least one of the transmissions occurs from within the communication zone; receiving the parameter signal at the vehicle-based unit; and providing an indication of the sensed parameter of the tire.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
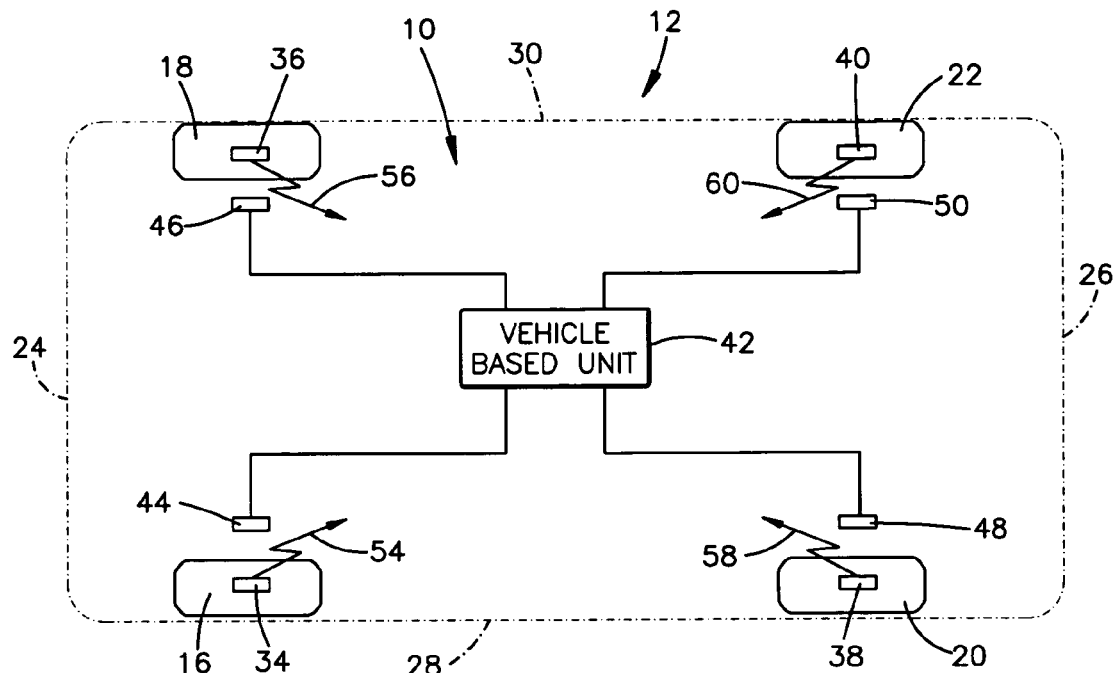
FIG. 1 schematically illustrates a vehicle including a tire parameter sensing system constructed in accordance with an exemplary embodiment of the present invention.

FIG. 1 schematically illustrates a vehicle 10 including a tire parameter sensing system 12 constructed in accordance with the present invention. For illustrative purposes, the vehicle 10 of FIG. 1 is an automobile having four tires 16, 18, 20, and 22. The present invention can be used with vehicles having a number of tires other than four.

The vehicle 10 has a front 24, a rear 26, and opposite left and right sides 28 and 30, respectively. FIG. 1 illustrates tire 16 at a front left corner location of the vehicle 10. Tire 18 is located at a front right corner location of the vehicle 10. Tire 20 is located at a rear left corner location of the vehicle 10 and tire 22 is located at a rear right corner location of the vehicle 10.

The tire parameter sensing system 12 includes four tire-based units 34, 36, 38, and 40, a vehicle-based unit 42, and four power transmitting antennas 44, 46, 48, and 50. Each tire 16, 18, 20, and 22 of the vehicle 10 includes an associated tire-based unit 34, 36, 38, and 40, respectively, for sensing at least one parameter, e.g., pressure, temperature, etc., of the tire and for providing a parameter signals 54, 56, 58, and 60, respectively, to the vehicle-based unit 42. The parameter signals 54, 56, 58, and 60 are indicative of the sensed parameter(s) of the tires 16, 18, 20, and 22, respectively. Preferably, the parameter signals 54, 56, 58, and 60 are radio frequency ("RF") signals.

Each of the tire-based units 34, 36, 38, and 40 has an associated one of the power transmitting antennas 44, 46, 48, and 50. In the embodiment illustrated in FIG. 1, power transmitting antenna 44 is associated with tire-based unit 34. Power transmitting antenna 46 is associated with tire-based unit 36. Power transmitting antenna 48 is associated with tire-based unit 38 and, power transmitting antenna 50 is associated with tire-based unit 40. Preferably, each of the power transmitting antennas 44, 46, 48, and 50 is located in a wheel well of the vehicle 10 adjacent the tire 16, 18, 20, or 22 having the tire-based unit 34, 36, 38, or 40 with which the power transmitting antenna is associated.

The power transmitting antennas 44, 46, 48, and 50 are operatively coupled to the vehicle-based unit 42 and are actuatable for producing magnetic fields. The power transmitting antennas 44, 46, 48, and 50 may have any known structure for producing the magnetic fields. The produced magnetic fields inductively couple the respective power transmitting antenna 44, 46, 48, and 50 to the tire-based unit 34, 36, 38, or 40 with which it is associated, as is discussed below with specific regard to power transmitting antenna 44 and tire-based unit 34.

Figure 2:
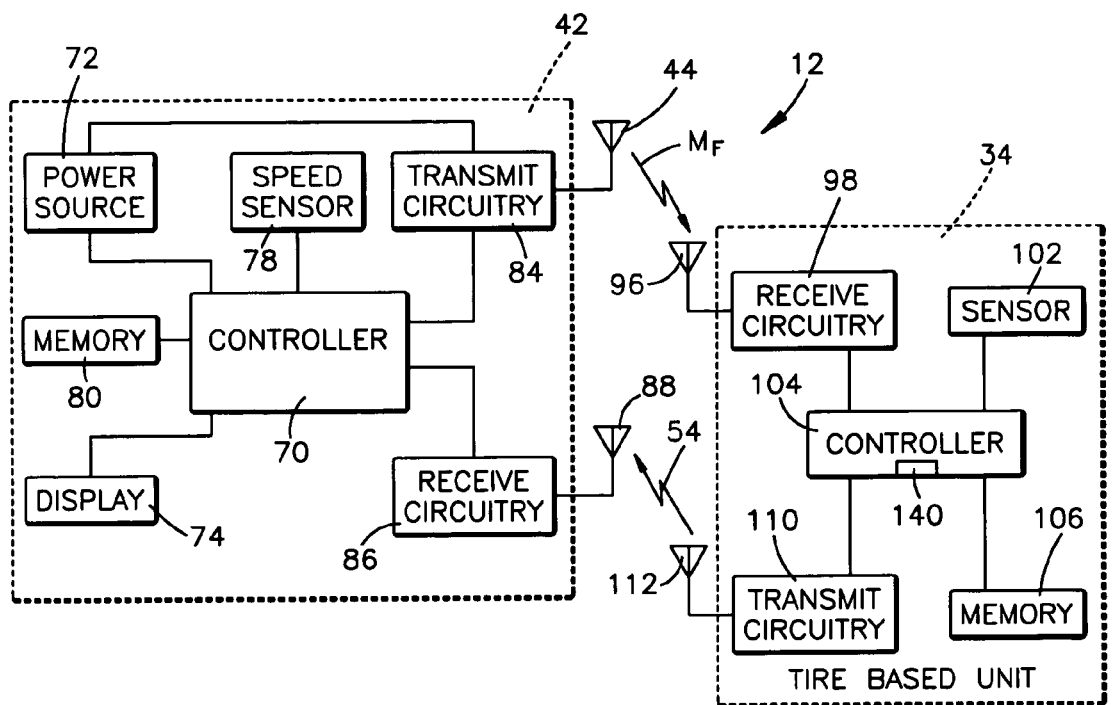
FIG. 2 is a schematic block diagram of a vehicle-based unit and a tire-based unit of the tire parameter sensing system of FIG. 1.

FIG. 2 is a schematic block diagram of the vehicle-based unit 42 and the tire-based unit 34 of the tire parameter sensing system 12 of FIG. 1. For purposes of example, FIG. 2 only illustrates tire-based unit 34 and only illustrates its associated power transmitting antenna 44. Tire-based units 36, 38, and 40 may have structures similar to tire-based unit 34 and may operate in a manner similar to tire-based unit 34. Similarly, power transmitting antennas 46, 48, and 50 may have structures similar to power transmitting antenna 44 and may operate in a manner similar to power transmitting antenna 44.

The vehicle-based unit 42 includes a controller 70. The controller 70 of the vehicle-based unit 42 is preferably a microcomputer. Alternatively, the controller 70 may be formed from discrete circuitry, an application-specific-integrated-circuit ("ASIC"), or any other type of control circuitry.

The vehicle-based unit 42 also includes a power source 72. The power source 72 provides electrical power to the controller 70 for powering the vehicle-based unit 42. The power source 72 preferably includes the battery of the vehicle 10 and an appropriate voltage regulator (not shown).

A display 74 is operatively connected to the controller 70. The display 74 is located in the occupant compartment of the vehicle 10 and is responsive to receipt of display signals from the controller 70 for providing an operator of the vehicle with indications of the sensed tire parameter(s) and, optionally, the associated corner location or tire location. For example, the display 74 may provide an indication of the sensed tire temperatures and the sensed tire pressures for each of the tires 16, 18, 20, and 22.

A vehicle speed sensor 78 also operatively connected to the controller 70. The vehicle speed sensor 78 is operative for sensing the speed of the vehicle 10 and for providing speed signals that are indicative of the sensed vehicle speed to the controller 70.

The vehicle-based unit 42 also includes a memory 80 that is operatively connected to the controller 70 or, alternatively, forms a portion of the controller. The memory 80 is a non-volatile memory that includes a lookup table in which identification codes of the tire-based units 34, 36, 38, and 40 of the tire parameter sensing system 12 are stored. Each of the tire-based units 34, 36, 38, and 40 has a unique identification code. The lookup table may also include associated location information for each tire-based unit 34, 36, 38, and 40. For example, the look-up table stored in memory 80 may associate an identification code of tire-based unit 34 with the front left corner location of the vehicle 10. The memory 80 also stores a known tire parameter sensing algorithm that is performed by the controller 70 of the vehicle-based unit 42.

Transmit circuitry 84 of the vehicle-based unit 42 is operatively connected to the controller 70. The controller 70 controls the transmit circuitry 84 for providing electrical power and vehicle speed information to the power transmitting antennas 44, 46, 48, and 50. Again, for purposes of brevity, FIG. 2 only illustrates power transmitting antenna 44. The transmit circuitry 84 includes a direct current ("DC") to alternating current ("AC") converter (not shown), such as an oscillator. The DC to AC converter outputs electrical energy having an alternating current the power transmitting antennas 44, 46, 48, and 50. The power transmitting antennas 44, 46, 48, and 50 are responsive to the alternating current for producing magnetic fields. The transmit circuitry 84 includes relay circuitry (not shown). The controller 70 controls the relay circuitry 84 for controlling the output of the alternating current to the power transmitting antennas 44, 46, 48, and 50. The transmit circuitry 84 also includes a modulator (not shown). The modulator receives speed signals that are indicative of the sensed vehicle speed from the controller 70 and modulates the speed signals onto the alternating current that is provided to the power transmitting antennas 44, 46, 48, and 50.

The vehicle-based unit 42 also includes receive circuitry 86 that is operatively coupled to the controller 70 and to a receiving antenna 88. The receiving antenna 88 is adapted to receive the transmitted parameter signals 54, 56, 58, and 60 and to provide the received signals to the receive circuitry 86. The receive circuitry 86 includes signal conditioning circuitry (not shown), such as filters, amplifiers, etc., and signal demodulating circuitry (not shown) for demodulating the received parameter signals and for outputting message packets received in the parameter signals to a controller 70. The sensed tire parameter(s) forms a portion of each message packet. Each message packet also includes additional information, such as the identification code of the transmitting tire-based unit.

The tire-based unit 34 of the tire parameter sensing system 12 includes an energy receiving antenna 96 that is operatively connected to receive circuitry 98. Electrical energy, i.e., a voltage and a current, is induced in the energy receiving antenna 96 when the antenna is placed within a magnetic field $M_F$ produced by the power transmitting antenna 44. The electrical energy induced in the energy receiving antenna 96 has an alternating current and includes the modulated speed signal.

The receive circuitry 98 of the tire-based unit 34 includes rectifying and regulating circuitry (not shown). The rectifying and regulating circuitry receives the electric energy from the energy receiving antenna 96, converts the alternating current of the received electrical energy to direct current, and outputs electrical energy having a regulated direct current. The rectifying and regulating circuitry provides the rectified and regulated electrical energy to an energy storage device (not shown), such as a capacitor, which provides the electrical energy for operation of the tire-based unit 34.

The receive circuitry 98 also includes a demodulator (not shown). The demodulator removes the speed signal that indicates the sensed vehicle speed from the received electric energy. The demodulated speed signal is provided from the receive circuitry to a controller 104 of the tire-based unit 34.

The tire-based unit 34 also includes a parameter sensor 102. The parameter sensor 102 may include one or more of a temperature sensor (not shown), a pressure sensor (not shown), and other sensors. The parameter sensor 102 is operable for sensing one or more parameters of tire 16 and for providing sensor signals indicative of the sensed tire parameter(s) to the controller 104.

The controller 104 is preferably a microcomputer. Alternatively, the controller 104 may be formed from discrete circuitry, an application-specific-integrated-circuit ("ASIC"), or any other type of control circuitry. The controller 104 is operatively coupled to the parameter sensor 102 and receives the sensor signals. The controller 104 performs a tire parameter sensing algorithm and outputs a message packet that includes the sensed parameter(s) of the tire 16. Any known tire parameter sensing algorithm may be used with the present invention. The controller 104 also receives the speed signal from the receive circuitry 98. As is described below, the controller 104 is responsive to the speed signal for monitoring rotation of tire 16 and controlling transmission of the parameter signals 54.

A memory 106 is operatively coupled to the controller 104. Alternatively, the memory 106 may form a portion of the controller 104. The memory 106 is a non-volatile memory in which the tire parameter sensing algorithm is stored. The memory 106 also stores the identification code for identifying the tire-based unit 34. The controller 104 includes the identification code in the output message packet.

The tire-based unit 34 also includes transmit circuitry 110. The transmit circuitry 110 is operatively coupled to the controller 104 and includes circuitry, such as a radio frequency ("RF") amplifier (not shown) and other known circuitry, for transmitting the parameter signals 54 via a transmitting antenna 112. The transmit circuitry 110 receives message packets from the controller 104 and transmits the message packets in the parameter signals 54. The message packets are modulated onto a constant frequency carrier signal using known modulation techniques, such as, for example, amplitude shift keying ("ASK"). Other signal modulation techniques, such as frequency shift keying, phase shift keying, etc., are also contemplated by the present invention.

Each of the parameter signals 54, 56, 58, and 60 includes a message packet that includes the identification code of the transmitting tire-based unit 34, 36, 38, and 40, respectively. When the controller 70 of the vehicle-based unit 42 receives a message packet from a received and demodulated parameter signal, the controller 70 determines whether the message packet originated in one of the tire-based units 34, 36, 38, or 40 of the tire parameter sensing system 12. To determine whether the message packet originated in one of the tire-based units 34, 36, 38, or 40, the controller 70 compares the identification code received in the message packet to identification codes stored in memory 80. When the controller 70 determines that the received message packet did not originate from one of the tire-based units 34, 36, 38, or 40, the controller 70 ignores the message packet. When the controller 70 determines that the received message packet did originate from one of the tire-based units 34, 36, 38, or 40, the controller 70 analyzes the tire parameter information received in the message packet and provides a display signal to the display 74. The display 74 is responsive to receipt of display signals for providing indications of the sensed parameter(s) to an operator of the vehicle 10.

Figure 3:
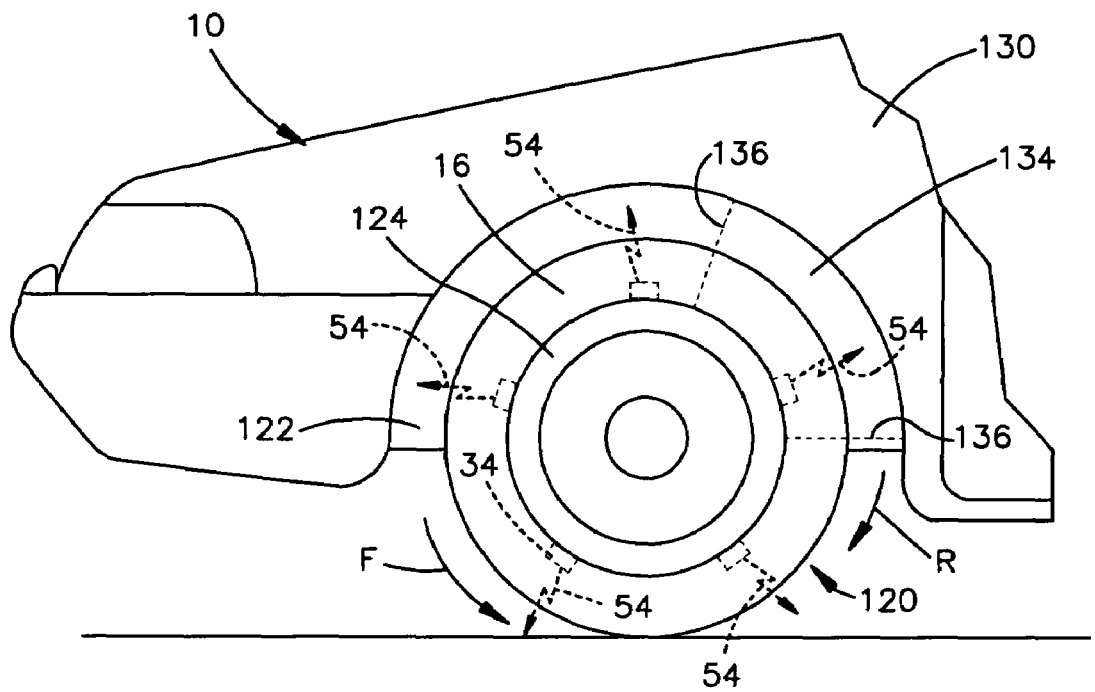
FIG. 3 illustrates a wheel assembly of the vehicle having an associated tire-based unit and being located in a wheel well of the vehicle.

FIG. 3 illustrates a wheel assembly 120 of the vehicle 10 located in an associated wheel well 122 of the vehicle. The wheel assembly 120 illustrated in FIG. 3 includes a rim 124 upon which tire 16 is mounted. FIG. 3 also schematically illustrates tire-based unit 34 fixed relative to the rim 124 at a location within the tire 16.

During vehicle movement, the wheel assembly 120 rotates within the wheel well 122 and relative to a body 130 of the vehicle 10. When the vehicle 10 is moving in a forward direction, the wheel assembly 120 rotates in the direction indicated in FIG. 3 by arrow F. When the vehicle 10 is moving in a rearward direction, the wheel assembly 120 rotates in the direction indicated in FIG. 3 by arrow R. The tire-based unit 34 rotates with the wheel assembly 120 relative to the body 130 of the vehicle 10. Dashed lines in FIG. 3 illustrate the tire-based unit 34 at various other locations relative to the body 130 of the vehicle 10 during rotation of the wheel assembly 120.

Communication of the parameter signal 54 from the tire-based unit 34 to the vehicle-based unit 42 is most probable when the tire-based unit 34 is located within a communication zone 134. The communication zone 134 is indicated schematically in FIG. 3 as the area between dashed lines 136. During rotation of the wheel assembly 120, the tire-based unit 34 periodically passes into and out of the communication zone 134. The tire-based unit 34 of the parameter sensing system 12 of the present invention is configured for transmitting the parameter signal 54 multiple times, with at least one of the transmissions occurring while the tire-based unit 34 is in the communication zone 134.

The controller 104 of the tire-based unit 34 controls the number and the timing of transmissions of the parameter signal 54. The number of transmissions of the parameter signal 54 is dependent upon the angle of rotation through which the tire-based unit 34 is located in the communication zone 134. The angle of rotation through which the tire-based unit 34 is located in the communication zone 134 is determined empirically. The angle of rotation through which a tire-based unit is located in the communication zone 134 may vary for each vehicle platform and may vary for each tire location or corner location of the vehicle 10. For example, the communication zone 134 for tire 16 may differ from a communication zone for tire 18.

After determining the angle of rotation through which the tire-based unit 34 is located in the communication zone 134, a number of transmissions for the parameter signal 54 is determined using the following formula:

$$N > 360 \div \alpha$$

where N is a minimum whole number (integer) of transmissions needed for ensuring that at least one transmission occurs in the communication zone 134, with the transmissions being spaced from one another by an approximately equal angle of rotation of the wheel assembly 120; and where α is the angle of rotation, in degrees, through which the tire-based unit 34 is located in the communication zone 134.

For example, in FIG. 3 the angle of rotation α through which the tire-based unit 34 is located in the communication zone 134 is approximately 75 degrees. According to the formula, the minimum number of transmissions N needed for ensuring that at least one transmission of the parameter signal 54 occurs in the communication zone 134, with the transmissions being spaced from a one another by an approximately equal angle of rotation of the wheel assembly 120, is five (N=5). As a result, the tire-based unit 34 of FIG. 3 is controlled to transmit the parameter signal 54 five times, with the transmissions being spaced from one another by an approximately equal angle of rotation of the wheel assembly 120. FIG. 3 illustrates the five transmissions of the parameter signal 54.

The controller 104 of the tire-based unit 34 controls the timing of each transmission of the parameter signal 54 so that the transmissions are spaced from one another by the approximately equal angle of rotation of the wheel assembly 120. To control the transmissions, the controller 104 is responsive to rotation information about the wheel assembly 120. Specifically, the controller 104 is responsive to the vehicle speed signal received from the vehicle-based unit 42. The controller 104 determines a rotation rate for the wheel assembly 120 from the vehicle speed signal and other known variables, such as the circumference of the tire 16. Alternatively, the controller 104 may access a look-up table that is stored in memory 106 for associating the vehicle speed to a rotation rate of the wheel assembly 120.

As shown in FIG. 2, the controller 104 of the tire-based unit 34 also includes an internal timer 140. Upon determining the rotation rate of the wheel assembly 120, the controller 104 is responsive to timing signals from the timer 140 for transmitting the parameter signals 54 so that the transmissions are spaced from one another by an approximately equal angle of rotation of the wheel assembly 120. FIGS. 4(a) and 4(b) graphically illustrate transmissions of the parameter signals 54 in accordance with first and second transmission schemes of the present invention.

In accordance with the transmission scheme of FIG. 4(a), the controller 104 of the tire-based unit 34 determines from the rotation rate of the wheel assembly 120, the amount of time required for the wheel assembly to rotate one complete revolution (or rotation). The controller 104 is responsive to the timer 140 for transmitting the parameter signals 54 at equally spaced time intervals during the revolution. Thus, according to the transmission scheme of FIG. 4(a), the transmission interval is equal to the time for one complete revolution divided by the determined minimum number of transmissions (N). For example, if the controller 104 of the tire-based unit 34 determines that the wheel assembly 120 rotates one complete revolution in one second and the determined minimum number of transmissions N is five, the controller 104 causes the parameter signals 54 to be transmitted at 0.2 seconds intervals. Assuming that the rotation rate of the wheel assembly 120 remains relatively constant during the time period for one complete revolution, the transmissions of the parameter signal 54 will be spaced from one another by an approximately equal angle of rotation of the wheel assembly 120, as shown by the five parameter signals 54 of FIG. 3. The transmission scheme of FIG. 4(a) is particularly useful when the parameter signals 54 have a relatively short package length.

Figure 4:
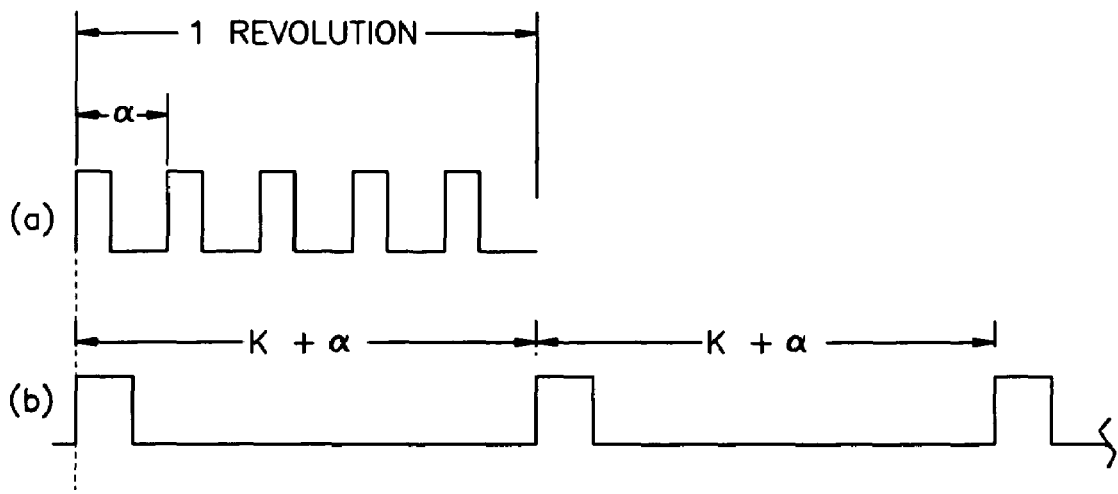
FIGS. 4(a) and 4(b) graphically illustrate the transmission of parameter signals from the tire-based unit in accordance with first and second transmission schemes, respectively, of the present invention.

In accordance with the transmission scheme of FIG. 4(b), the controller 104 of the tire-based unit 34 determines from the rotation rate of the wheel assembly 120, the amount of time required for the wheel assembly to rotate one complete revolution (or rotation). The controller 104 is responsive to the timer 140 for transmitting the parameter signals 54 at equally spaced time intervals during multiple revolutions. Thus, according to the transmission scheme of FIG. 4(b), the transmission interval is equal to a variable K plus the quotient of the time for one complete revolution divided by the determined minimum number of transmissions (N). Preferably, the variable K is equal to the amount of time for the wheel assembly 120 to rotate one complete revolution. Thus, for example, if the controller 104 of the tire-based unit 34 determines that the wheel assembly 120 rotates one complete revolution in one second and the minimum number of transmissions N is five, the controller 104 causes the parameter signal to be transmitted every 1.2 seconds. Assuming that the rotation rate of the wheel assembly 120 remains relatively constant during the time period for the five transmissions, the transmissions of the parameter signal 54 will be spaced from one another by an approximately equal angle of rotation of the wheel assembly 120, as shown by the five parameter signals 54 of FIG. 3. FIG. 4(*b*) illustrates only three of the five transmissions of the parameter signal 54.

The transmission scheme of FIG. 4(*b*) is particularly useful when the parameter signals 54 have long package length. For example, if due to the rotation rate of the wheel assembly 120 and the package length of the parameter signal 54, an overlap of adjacent parameter signals 54 occurs, the transmission scheme of FIG. 4(*b*) may be used to avoid such overlaps. An overlap may occur, for example, when the parameter signal 54 takes longer to transmit than the determined interval between transmissions.

Figure 5:
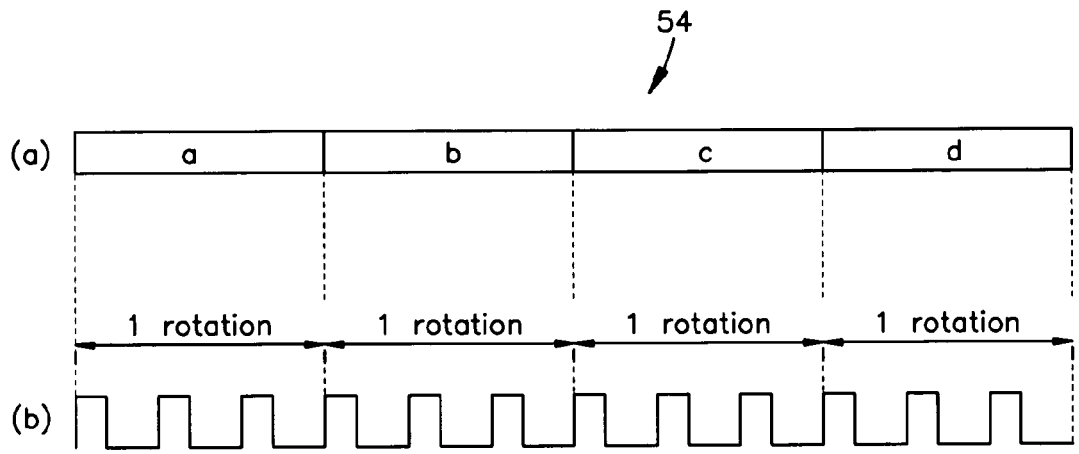
FIG. 5(a) illustrates an example parameter signal that may be transmitted by the tire-based unit.
FIG. 5(b) graphically illustrates the transmission of the parameter signal of FIG. 5(a) from the tire-based unit in accordance with a third transmission scheme of the present invention.

A third transmission scheme is illustrated with reference to FIGS. 5(*a*) and 5(*b*). FIG. 5(*a*) schematically illustrates an exemplary parameter signal 54 that may be transmitted by the tire-based unit 34. The parameter signal 54 of FIG. 5(*a*) has a sufficient length that the transmission may not be completed during the time period that the tire-based unit 34 is located in the communication zone 134. For example, if the parameter signal 54 takes 0.12 seconds to transmit and, due to the rotation rate of the wheel assembly 120, the tire-based unit 34 is only located in the communication zone for 0.1 seconds per revolution, the transmission of the parameter signal 54 cannot be completed during the time period that the tire-based unit 34 is located in the communication zone 134. The parameter signal 54 of FIG. 5(*a*) has four distinct signal portions, indicated as portion a, portion b, portion c, and portion d. In an example parameter signal 54, portion a may include a wakeup portion of the message packet of the parameter signal 54, portion b may include the identification code of the tire-based unit 34, portion c may include the sensed tire parameter(s), and portion d may include other data and check bits.

FIG. 5(*b*) illustrates the transmission scheme for the parameter signal 54 of FIG. 5(*a*). In accordance with the transmission scheme of FIG. 5(*b*), the controller 104 of the tire-based unit 34 determines from the rotation rate of the wheel assembly 120, the amount of time required for the wheel to rotate one complete revolution (or rotation). The controller 104 is responsive to the timer 140 for transmitting a portion of the parameter signals 54 at equally spaced time intervals during the revolution of the wheel assembly 120 and during with subsequent revolutions of the wheel transmitting subsequent portions of the parameter signal. Thus, according to the transmission scheme of FIG. 5(*b*), each portion a, b, c, and d of the parameter signal 54 is transmitted the determined minimum number of transmissions (N) and the transmission interval between each transmission is equal to the time for one complete revolution of the wheel assembly 120 divided by the determined minimum number of transmissions (N). For example, when the determined minimum number of transmissions (N) is equal to three, the controller 104 of the tire-based unit 34 causes portion a of the parameter signal 54 to be transmitted at three approximately equally spaced time intervals during the first revolution of the wheel assembly 120, as is shown with reference to FIG. 5(*b*). During the second revolution of the wheel assembly 120, the controller 104 causes portion b of the parameter signal 54 to be transmitted at three approximately equally spaced time intervals. Likewise, the controller 104 causes portion c of the parameter signal 54 to be transmitted at three approximately equally spaced time intervals during the third revolution of the wheel assembly 120 and causes portion d of the parameter signal 54 to be transmitted at three approximately equally spaced time intervals during the fourth revolution of the wheel. Assuming that the rotation rate of the wheel assembly 120 remains relatively constant during the time period for the four complete revolutions, the transmissions will be spaced from one another by an approximately equal angle of rotation of the wheel assembly 120. Also, at least one transmission of each portion a, b, c, and d of the parameter signal 54 will occur within the communication zone 134.

Figure 6:
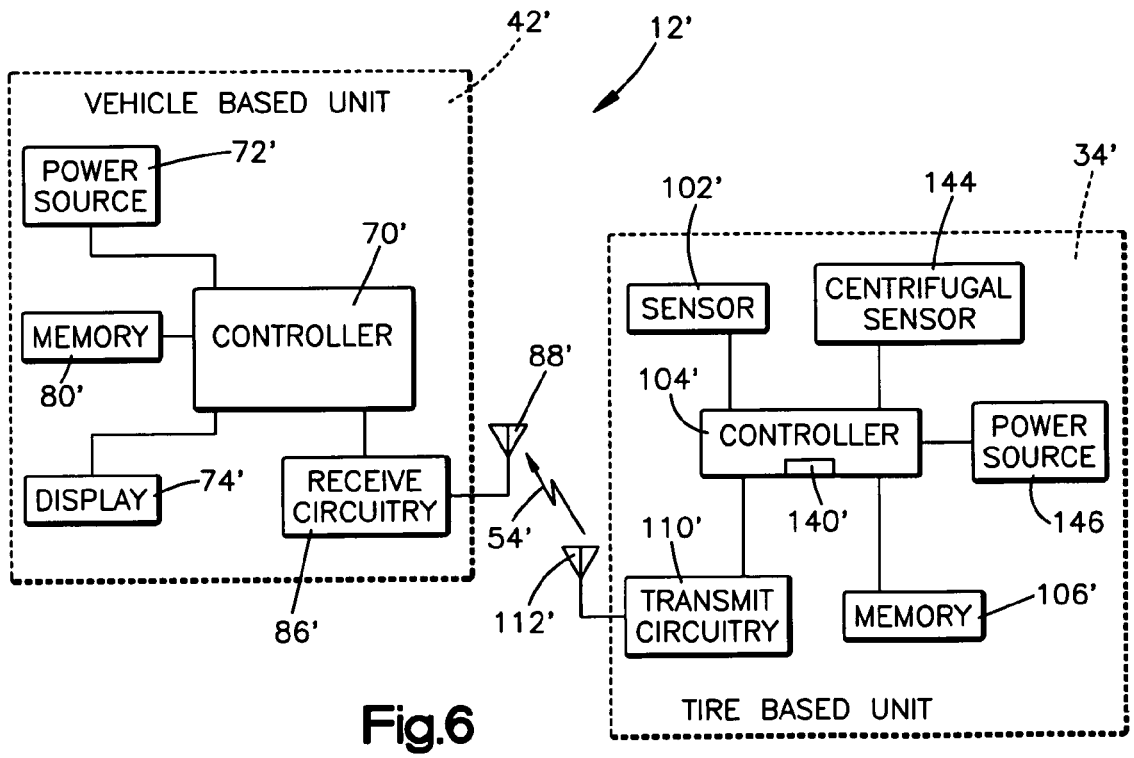
FIG. 6 is a schematic block diagram of a vehicle-based unit and a tire-based unit of a tire parameter sensing system constructed in accordance with a second embodiment of the present invention.

FIG. 6 is a schematic block diagram of a vehicle-based unit 42' and a tire-based unit 34' of a tire parameter sensing system 12' constructed in accordance with a second embodiment of the present invention. As was discussed with reference to FIG. 2, the tire parameter sensing system 12' of FIG. 6 may include more than one tire-based unit, however, for brevity, only tire-based unit 34' is discussed with reference to FIG. 6. Also, the features of FIG. 6 that are the same as or similar to those of FIG. 2 are labeled with the same reference number with the addition of a prime.

In the tire parameter sensing system 12' of FIG. 6, no signals are transmitted from the vehicle-based unit 42' to the tire-based unit 34'. Therefore, the tire parameter sensing system 12' does not include power transmitting antennas, the vehicle-based unit 42' does not include transmit circuitry and an associated transmission antenna, and the tire-based unit 34' does not include receive circuitry and an associated receiving antenna. As a result, one-way communication from the tire-based unit 34' to the vehicle-based unit 42' is provided in the tire parameter sensing system 12' of FIG. 6.

The vehicle-based unit 42' includes a controller 70'. The controller 70' of the vehicle-based unit 42' is preferably a microcomputer. Alternatively, the controller 70' may be formed from discrete circuitry, an application-specific-integrated-circuit ("ASIC"), or any other type of control circuitry.

The vehicle-based unit 42' also includes a power source 72'. The power source 72' provides electrical power to the controller 70' for powering the vehicle-based unit 42'. The power source 72' preferably includes the battery of the vehicle and an appropriate voltage regulator (not shown).

A display 74' is operatively connected to the controller 70'. The display 74' is located in the occupant compartment of the vehicle and is responsive to receipt of display signals from the controller 70' for providing a vehicle operator with indications of the tire parameter information and, optionally, the associated corner location or tire location.

The vehicle-based unit 42' also includes a memory 80' that is operatively connected to the controller 70' or, alternatively, forms a portion of the controller. The memory 80' is a non-volatile memory that includes a lookup table in which identification codes of each of its associated tire-based units, including tire-based unit 34', is stored. The lookup table may also include associated location information for each tire-based unit. The memory 80' also stores a known tire parameter sensing algorithm that is performed by the controller 70' of the vehicle-based unit 42'.

The vehicle-based unit 42' also includes receive circuitry 86' that is operatively coupled to the controller 70' and to a receiving antenna 88'. The receiving antenna 88' is adapted to receive transmitted parameter signals and to provide the received parameter signals to the receive circuitry 86'. The receive circuitry 86' includes signal conditioning circuitry (not shown), such as filters, amplifiers, etc., and signal demodulating circuitry (not shown) for demodulating the received parameter signals and for outputting message packets received in the parameter signals to a controller 70'.

The tire-based unit 34' of the tire parameter sensing system 12' includes a parameter sensor 102'. The parameter sensor 102' may include one or more of a temperature sensor (not shown), a pressure sensor (not shown), and other sensors. The parameter sensor 102' is operable for sensing one or more parameters of the associated tire and for providing sensor signals indicative of the sensed tire parameter(s) to a controller 104' of the tire-based unit 34'.

The controller 104' is preferably a microcomputer. Alternatively, the controller 104' may be formed from discrete circuitry, an application-specific-integrated-circuit ("ASIC"), or any other type of control circuitry. The controller 104' is operatively coupled to the parameter sensor 102' and receives the sensor signals. The controller 104' performs a tire parameter sensing algorithm and outputs a message packet that includes tire parameter information. Any known tire parameter sensing algorithm may be used with the present invention.

A memory 106' is operatively coupled to the controller 104'. Alternatively, the memory 106' may form a portion of the controller 104'. The memory 106' is a non-volatile memory in which the tire parameter sensing algorithm is stored. The memory 106' also stores an identification code for identifying the tire-based unit 34'. The controller 104' includes the identification code in the output message packet.

The tire-based unit 34' includes a centrifugal force sensor 144 for sensing centrifugal force and for providing the controller 104' with centrifugal force signals indicative of the sensed centrifugal force. The controller 104' is responsive to the centrifugal force signals for determining the rotation rate of the tire in which the tire-based unit 34' is located. For example, the controller 104' may access a look-up table that is stored in memory 106' that correlates the sensed centrifugal force to the rotation rate for the tire.

The tire-based unit 34' also includes an internal power source 146. The power source 146 of the tire-based unit 34' preferably a long life lithium battery. The power source 146 provides all of the electrical power used during operation of the tire-based unit 34'.

The tire-based unit 34' also includes transmit circuitry 110'. The transmit circuitry 110' is operatively coupled to the controller 104' and includes circuitry, such as a radio frequency ("RF") amplifier (not shown) and other known circuitry, for transmitting a parameter signal 54' via a transmitting antenna 112'. The transmit circuitry 110' receives message packets from the controller 104' and transmits the message packets in the parameter signals 54'. The message packets are modulated onto a constant frequency carrier signal using known modulation techniques, such as, for example, amplitude shift keying ("ASK"). Other signal modulation techniques, such as frequency shift keying, phase shift keying, etc., are also contemplated by the present invention.

When the controller 70' of the vehicle-based unit 42' receives a message packet from a demodulated parameter signal, such as, for example, parameter signal 54', the controller 70' determines whether the message packet originated in one of its associated tire-based units, such as tire-based unit 34'. To determine whether the message packet originated in one of its associated tire-based units, the controller 70 compares the identification code received in the message packet to identification codes stored in memory 80'. When the controller 70' determines that the received message packet did not originate from one of its associated tire-based units, the controller 70' ignores the message packet. When the controller 70' determines that the received message packet did originate from one of its associate tire-based units, such as tire-based unit 34', the controller 70' analyzes the tire parameter information received in the message packet and provides a display signal to the display 74'. The display 74' is responsive to receipt of display signals for providing indications of the tire parameter information.

The tire-based unit 34' of the tire parameter sensing system 12' operates in a similar manner to the tire-based unit 34 of the tire parameter sensing system 12. Specifically, the controller 104' of the tire-based unit 34' controls transmission of the parameter signal 54' in accordance with one of the three transmission schemes shown and described with specific reference to FIGS. 4(*a*), 4(*b*), and 5(*b*). As a result, the controller 104' is responsive to the rotation of its associated wheel assembly for controlling the transmission of a number of parameter signals 54' with the parameter signals being spaced from one another by an approximately equal angle of rotation of the wheel assembly so that at least one of the parameter signals is transmitted within the communication zone.

From the above description of the invention, those skilled in the art will perceive improvements, changes and modifications. For example, a wheel speed sensor, such as is commonly found in anti-lock braking systems, may be used for providing rotation information of a wheel assembly. Such improvements, changes and modifications within the skill of the art are intended to be covered by the appended claims.

Having describe the invention, I claim the following:

1. A tire parameter sensing system for a vehicle, the system comprising:
    a vehicle-based unit for receiving parameter signals and for providing tire parameter information to an operator of the vehicle;
    a tire-based unit associated with a tire of the vehicle and rotating with the tire, the tire-based unit being located in a communication zone for communicating with the vehicle-based unit through only a portion of each rotation of the tire, the tire-based unit being configured to sense at least one parameter of the tire and to transmit a parameter signal indicative of the sensed parameter while in the communication zone; and
    means for monitoring the rotation of the tire and for providing rotation information indicative of the monitored tire rotation;
    the tire-based unit being responsive to the rotation information for transmitting the parameter signal while the tire-based unit is located in the communication zone;
    wherein the tire-based unit transmits the parameter signal at least a minimum number of times so as to ensure occurrence of the transmitted parameter signal when the tire-based unit is in the communication zone, transmissions of the parameter signal being spaced from one another by approximately egual angles.

2. The tire parameter sensing system of claim 1 wherein the rotation information indicates a rotation rate of a wheel assembly that includes the tire, the tire-based unit being responsive to the rotation rate for transmitting the parameter signal.

3. The tire parameter sensing system of claim 2 wherein the means for monitoring the rotation of the tire includes a vehicle speed sensor for sensing a speed of the vehicle, the rotation rate of the wheel assembly being determined from the sensed speed of the vehicle.

4. The tire parameter sensing system of claim 2 wherein the means for monitoring the rotation of the tire includes a centrifugal sensor that is located on the wheel assembly and that provides centrifugal force signals indicative of a sensed centrifugal force, the rotation rate of the wheel assembly being determined from the centrifugal force signals.

5. The tire parameter sensing system of claim 1 further comprising a controller associated with said tire-based unit, wherein said controller is capable of sensing an oversized parameter signal too large for transmission during time within the communication zone during a single rotation of the tire.

6. The tire parameter sensing system of claim 1 wherein the minimum number of times the parameter signal is transmitted is greater than a quotient of 360 degrees divided by an angle of rotation of the tire in which the tire-based unit is located in the communication zone.

7. The tire parameter sensing system of claim 1 wherein the parameter signal is transmitted the minimum number of times during a single rotation of the tire.

8. The tire parameter sensing system of claim 1 wherein the parameter signal is transmitted the minimum number of times during a plurality of rotations of the tire.

9. The tire parameter sensing system of claim 1 wherein the tire-based unit includes a controller having a timer, the controller being responsive to the timer for causing transmissions of the parameter signal at approximately equally spaced time intervals.

10. The tire parameter sensing system of claim 9 wherein the parameter signal is transmitted the minimum number of times during a single rotation of the tire.

11. The tire parameter sensing system of claim 1 wherein the parameter signal includes at least first and second portions, the tire-based unit transmitting the first portion of the parameter signal at approximately equally spaced angles of rotation of the tire and subsequently transmitting the second portion of the parameter signal at approximately equally spaced angles of rotation of the tire.

12. The tire parameter sensing system of claim 5, wherein said controller upon sensing the oversized parameter signal partitions said oversized parameter signal into a minimum number of portions such that each portion is transmitted during separate rotations of the tire.

13. A tire parameter sensing system for a vehicle, the system comprising:
   a vehicle-based unit for receiving parameter signals and for indicating tire parameter information to an operator of the vehicle;
   a tire-based unit associated with a tire of the vehicle and rotating with the tire, the tire-based unit being located in a communication zone for communicating with the vehicle-based unit through only a portion of each rotation of the tire, the tire-based unit being configured to sense at least one parameter of the tire and to transmit a parameter signal indicative of the sensed parameter; and
   means for monitoring the rotation of the tire and for providing rotation information indicative thereof;
   the tire-based unit being responsive to the rotation information for transmitting the parameter signal at least a minimum number of times with the transmissions of the parameter signal being spaced from one another by an approximately equal angle of rotation of the tire so that at least one of the transmissions occurs from within the communication zone.

14. A method of operating a tire parameter sensing system of a vehicle in which a tire-based unit is associated with a tire of the vehicle and rotates with the tire, the tire-based unit being located in a communication zone with a vehicle-based unit through only a portion of each rotation of the tire, the method comprising the steps of:
   operating the tire-based unit to sense at least one parameter of the tire;
   monitoring rotation of the tire and providing rotation information indicative of the monitored tire rotation;
   transmitting, in response to the rotation information, a parameter signal indicative of the sensed tire parameter from the tire-based unit to the vehicle-based unit at least a minimum number of times so as to ensure occurrence of the transmitted parameter signal while the tire-based unit is located in the communication zone, transmissions of the parameter signal being spaced from one another by an approximately egual angle;
   receiving the parameter signal at the vehicle-based unit; and
   providing an indication of the sensed parameter of the tire.

15. The method of claim 14 wherein the step of monitoring rotation of the tire further comprises the step of determining a rotation rate of a wheel assembly that includes the tire.

16. The method of claim 15 wherein the step of determining the rotation rate of the wheel assembly further comprises the steps of sensing a speed of the vehicle and determining the rotation rate of the wheel assembly from the sensed speed.

17. The method of claim 15 wherein the step of determining the rotation rate of the wheel assembly further comprises the steps of sensing a centrifugal force at a location on the wheel assembly, and determining the rotation rate of the wheel assembly from the sensed centrifugal force.

18. The method of claim 14 wherein the step of transmitting the parameter signal at least the minimum number of times includes the step of transmitting the parameter signal a number of times that is greater than a quotient of 360 degrees divided by an angle of rotation of the tire in which the tire-based unit is located in the communication zone.

19. The method of claim 14 further including the step of transmitting the parameter signal the minimum number of times during a single rotation of the tire.

20. The method of claim 14 further including the step of transmitting the parameter signal the minimum number of times during a plurality of rotations of the tire.

21. The method of claim 14 further including the step of transmitting the parameter signal the minimum number of times with transmissions of the parameter signal occurring at approximately equally spaced time intervals.

22. The method of claim 21 further including the steps of determining a time period for the tire to rotate a single rotation, and transmitting the parameter signal the minimum number of times and at approximately equally spaced time intervals during the time period for the tire to rotate the single rotation.

23. The method of claim 14 further including the steps of transmitting a first portion of the parameter signal at approximately equally spaced angles of rotation of the tire, and subsequently transmitting a second portion of the parameter signal at approximately equally spaced angles of rotation of the tire.

24. A method of operating a tire parameter sensing system for a vehicle in which a tire-based unit is associated with a tire of the vehicle and rotates with the tire, the tire-based unit being located in a communication zone with a vehicle-based unit through only a portion of each rotation of the tire, the method comprising the steps of:

operating the tire-based unit to sense at least one parameter of the tire;

monitoring rotation of the tire and providing rotation information indicative of the monitored tire rotation;

transmitting, in response to the rotation information, a parameter signal, indicative of the sensed parameter of the tire, transmissions of the parameter signal being spaced relative to the size of the communication zone and spaced from one another by an approximately equal angle of rotation of the tire so at least one of the transmissions occurs from within the communication zone;

receiving the parameter signal at the vehicle-based unit; and providing an indication of the sensed parameter of the tire.

* * * * *